(12) United States Patent
Lefebvre et al.

(10) Patent No.: US 8,073,587 B2
(45) Date of Patent: Dec. 6, 2011

(54) DIAGNOSTIC METHOD FOR LOCATING A FAILURE IN A COMPLEX SYSTEM, AND A DEVICE FOR IMPLEMENTING SAID METHOD

(75) Inventors: Arnaud Lefebvre, Aix En Provence (FR); Christian Feuillebois, Lambesc (FR); Mathieu Glade, Sanary sur Mer (FR)

(73) Assignee: Eurocopter, Marignane Cedex (FR)

( * ) Notice: Subject to any disclaimer, the term of this patent is extended or adjusted under 35 U.S.C. 154(b) by 381 days.

(21) Appl. No.: 12/497,816

(22) Filed: Jul. 6, 2009

(65) Prior Publication Data

US 2010/0037099 A1    Feb. 11, 2010

(30) Foreign Application Priority Data

Jul. 7, 2008  (FR) ...................................... 08 03835

(51) Int. Cl.
*G06F 11/07*    (2006.01)

(52) U.S. Cl. ............... 701/33; 701/14; 701/35; 702/183

(58) Field of Classification Search .................. 701/3, 9, 701/14, 29, 33–35, 36; 714/26; 702/182–184
See application file for complete search history.

(56) References Cited

U.S. PATENT DOCUMENTS

| | | | |
|---|---|---|---|
| 5,210,704 A | 5/1993 | Husseiny | |
| 7,013,210 B2* | 3/2006 | McBrien et al. | ............... 701/100 |
| 7,016,825 B1* | 3/2006 | Tryon, III | ......... 703/6 |

FOREIGN PATENT DOCUMENTS

GB        2426090        11/2006

* cited by examiner

*Primary Examiner* — Richard M. Camby
(74) *Attorney, Agent, or Firm* — Brooks Kushman P.C.

(57) ABSTRACT

A diagnostic method for locating a failure in a complex system that includes the steps of detecting operating information using a detector device; verifying a performance of the system based on the operating information; determining an operating status of the system to be one of "operational," "non-operational" and "degraded" based on the operating information; comparing the operating information with predetermined data when the operation status is one of "operational," "non-operational" and "degraded;" and generating at least one hypothesis as to a location of the failure of the system.

14 Claims, 2 Drawing Sheets

DIAGNOSTIC METHOD FOR LOCATING A FAILURE IN A COMPLEX SYSTEM, AND A DEVICE FOR IMPLEMENTING SAID METHOD

Priority is claimed to French Application No. FR 08 03835, filed Jul. 7, 2008, the entire disclosure of which is incorporated by reference herein.

The present invention relates to the general technical field of methods of diagnosing failures in complex systems. Such complex systems are to be found in particular in aircraft, such as helicopters, where they serve to optimize management of their operation in various flight configurations. For safety reasons, it is essential to identify any malfunction in order to determine its cause and replace the faulty element.

BACKGROUND

The term "complex systems" is used to mean systems comprising a plurality of interconnected elements, such as electrical components, electronic components, or computers. Such complex systems are to be found in various economic sectors and in particular in aviation, industry, or automation. Problems often arise during maintenance operations, insofar as it can be very difficult to locate a defective element of the system that is giving rise to a failure.

Furthermore, implementing failure detection methods with additional detection equipment, is not always effective since, for reasons of safety, that can lead to an entire set of elements being replaced. In any event, maintenance operations that do not enable a failure to be located accurately, or that involve the use of additional detection equipment, give rise to an increase in maintenance costs.

Diagnostic methods are already known for locating a failure in a complex system, which methods consist: in verifying the performance of the complex system on the basis of operating information issued by detector means; in responding to the operating information to determine an operating status of the system that may be "operational", "non-operational", or "degraded"; and when the operating status is determined to be "non-operational" or "degraded", in comparing the operating information with predetermined information; and in generating at least one hypothesis as to the location of the failure in the complex system.

Those diagnostic methods nevertheless present a certain number of drawbacks. Known diagnostic methods are based, amongst other things, on a probabilistic analysis of failure. Such analysis generally makes it possible to inform the maintenance operator about one or more elements that might be giving rise to a failure, with some given degree of certainty. This degree is expressed by calculating a corresponding probability. Known diagnostic methods use a calculation algorithm that usually involves quasi-arbitrary approximations and weightings for the failure messages coming from various tests. In addition, diagnostic methods define arbitrary time windows, e.g. having a duration of ten seconds, during which the failure messages relating to distinct failures are taken into account. The results obtained in this way by such algorithms for locating a failure in a complex system are therefore not suitable for practical use.

For example, document GB 2 426 090 discloses a method of determining the time remaining before failure for complex systems or subsystems. The method described is based on using statistical and probabilistic analysis of the reliability of the monitored systems. The method makes use firstly of determining failures on the basis of an operating data history relating to the monitored systems, and secondly on continuous surveillance of said systems by means of sensors. The recorded historical data also makes it possible to establish causal networks for identifying the causes of failures by implementing mathematical distribution functions. These functions are based on probabilities making it possible to establish to reliability and the probability density for said systems.

Diagnostic methods are also known that are based on a static failure tree, defining logical relationships between breakdown messages via a certain number of logic gates. By way of example, mention can be made of:

the "AND" logic gate that is true when all of its 2 to n inputs are true;

the "OR" logic gate that is true when at least one of its n inputs is true;

the "NOT" logic gate that presents an output that is the inverse of the input (generally in the form of a "NAND" gate or a "NOR" gate that presents an output that is the inverse of an "AND" logic gate or of an "OR" logic gate);

a "K-of-M" logic gate that is true when K out of a total of M of its inputs are true.

A dynamic failure tree is also known from a field other than diagnosis, which tree defines logic and dynamic relationships between breakdown messages by a certain number of additional logic gates. By way of example, mention can be made of:

the priority AND gate, or "PAND" gate, that is true when all of its inputs are true in a predefined order; and the functional dependency gate, or "FDEP" gate, that is true if one specific input is true or if a set of gates is true. Thus, when the specific input is true, all of the other inputs are forced to take on a true state.

Nevertheless, it has been found that those logic gates do not enable a diagnosis to be obtained that is sufficiently accurate for locating failures in a complex system.

Known methods also generate numerous false breakdowns due to taking account of breakdown messages outside their context. This often leads to diagnosis being polluted, and consequently to difficulties in locating breakdowns and in particular to ambiguities in locations for said breakdowns. At the end of each flight, a very large number of pieces of equipment are thus said to be faulty.

SUMMARY OF THE INVENTION

An aspect of the present invention is to provide a novel diagnostic method that makes it possible to overcome the above-mentioned limitations and to take account of the problem as a whole in the context of filtering breakdown messages and locating said breakdown.

Another aspect of the present invention is to obtain better accuracy in locating a failure, while not significantly increasing the cost associated with obtaining such a location.

In another embodiment, the present invention provides a novel diagnostic method that can be implemented in existing complex systems, without requiring alterations, in particular alterations concerning the arrangement of detector means such as sensors, and by optimizing the use of existing test means.

Another embodiment provides a novel device for providing assistance in locating failures by implementing the above-mentioned diagnostic method. The device in accordance with the invention thus comprises tools for processing breakdown messages in an overall view of the system as opposed to processing said messages as such, outside a particular context or environment.

An embodiment of the present invention provides a diagnostic method for locating a failure in a complex system, the method consisting: in verifying the performance of the complex system on the basis of operating information issued by detector means; in responding to the operating information by determining an operating status of the system that is said to be "operational", "non-operational", or "degraded"; and when a "non-operational" or "degraded" operating status has been determined, in comparing the operating information with predetermined data; and in generating at least one hypothesis as to the location of the failure in the complex system;

wherein the method comprises:

in a first step (100), triggering a diagnostic algorithm by detecting failure occurrences within the operating information and generating corresponding failure messages or recovering failure messages generated directly by the complex system;

in a second step (200), filtering the failure messages to eliminate erroneous failure messages by defining logical and dynamic relationships of a dynamic failure tree that must be satisfied by said failure messages;

in a third step (300), capturing the information inherent to the failure messages that remain at the end of the preceding step;

in a fourth step (600), taking the failure messages from a time window T, sorting the results obtained by the preceding step, and comparing said results with the predetermined data by using logical and dynamic relationships of a dynamic failure tree to identify and locate a failure; and in a fifth step (700), generating a diagnosis identifying and locating the failure.

The dynamic failure tree makes it possible to generate rules for use during the second step (200) and the fourth step (600), corresponding respectively to filtering and to data analysis-and-comparison. The dynamic failure tree thus determines logic and dynamic relationships between the failure messages, the context data such as values issued by sensors, and the duration and the rate of occurrence of the failure messages.

In an implementation of the diagnostic method in accordance with the invention, the third step (300) comprises:

a first stage (310) consisting in determining the times at which failure messages appear and disappear;

a second stage (320) consisting in verifying whether the same failure message appears on redundant pieces of equipment, and if so grouping said messages together for analysis purposes; and a third stage (330) consisting in determining whether dependency exists between the failure messages that appear in a time window T, and if there is no such dependency, in processing them separately.

By way of example, the messages that appear are considered as relating to the same breakdown when the time differences between the times at which the respective messages appear and the time differences between the times at which the respective messages disappear, are below a predetermined threshold S.

If $t1_a$ and $t2_a$ are the respective appearance times of messages (1) and (2), and if $t1_d$ and $t2_d$ are the respective disappearance times of said messages (1) and (2), then a strong correlation is obtained if $t1_a-t2_a$ and $t1_d-t2_d$ are below the threshold S.

In an implementation of the diagnostic method in accordance with the invention, the third step (300) comprises:

a counting stage (340) consisting in determining the number of failure messages that appear in the time window T; and a timing stage (350) consisting in determining the durations of the failure messages.

In an implementation, the diagnostic method in accordance with the invention consists, in the event of ambiguity in the location of a failure at the end of the fourth step (600), in implementing an additional step (650) consisting in performing probabilistic analysis.

In an implementation, the probabilistic analysis consists in taking the breakdown messages generated by equipment subassemblies, in identifying the subassemblies that are ambiguous as to location; and then in determining a ratio for the mean time between failures (MTBF) of said subassemblies, which ratio constitutes additional information on which to base locating the failure.

For this purpose, use is made of the results of failure mode and effects analysis (FMEA), either at component level, or at functional block level, in order to define the probability of a breakdown in each of the subassemblies making up a piece of equipment.

When in a state where there is ambiguity concerning the location of the failure between two pieces of equipment, in the prior art a ratio is established between the failure rates for each of those two pieces of equipment as a whole. This amounts to performing first processing with messages relating to the nature of breakdowns and then in ignoring these messages relating to the nature of the breakdown in the report made subsequently. This leads to a ratio of a set of failure messages that might appear for each of the two pieces of equipment as a whole. This leads to a loss of information concerning the failing portion of a piece of equipment, even though that information was available initially. The diagnostic method in accordance with the invention makes it possible to mitigate that drawback.

In general when there is ambiguity about a breakdown, it comes from the inputs/outputs of the various pieces of equipment. In the context of the invention, a ratio is taken not between the equipment failure rates, but between the failure rates of the various modules that are suspected of failing. For example, this might be the ratio between the reliability (or failure rate) of the output block of pieces of equipment No. 1 and the reliability of the input block of pieces of equipment No. 2.

In an implementation of the diagnostic method in accordance with the invention, the fourth step (600) includes an ordering stage (610) consisting in determining a chronological order for the failure messages.

In an implementation of the diagnostic method in accordance with the invention, the fourth step (600) includes a context stage (620) consisting in performing context correlation analysis on the failure messages.

In an implementation of the diagnostic method in accordance with the invention, the second step (200) includes a filter stage (210) consisting in filtering the failure messages as a function of the durations of appearance of said messages.

It is found that about 40% of failure or breakdown messages have an appearance duration that is shorter than three seconds. Such transient breakdowns may be due for example to poorly-defined detection thresholds or to problems with connectors.

The breakdown detection threshold may be under-dimensioned relative to the physical phenomenon being measured. For example, electronic equipment can detect power line disturbances of very short duration that occur during the normal operation of a helicopter. The durations of these disturbances may be longer than determined thresholds, and can thus give rise to breakdown messages.

In a given environment, a helicopter may be subjected to vibration stresses that give rise to a large number of short disturbances in communications, associated with connectors and not corresponding at all to breakdowns.

In an implementation of the diagnostic method in accordance with the invention, the second step (200) consists in using a filtering and correlation stage (220) to filter the failure messages as a function of a correlation between said messages and a context such as in-flight or on the ground.

By way of example, complex information may comprise:
various stages of flight, stages on the ground, and in particular stages of switching pieces of equipment on and off;
pilot actions;
helicopter configurations; and
the dynamic configuration of the helicopter corresponding to the on/off states of various pieces of equipment.

It is also appropriate to filter erroneous breakdown messages that results from the external environment. A helicopter may be started with the help of a battery, giving rise to one side of the helicopter starting followed by the other side starting. During this starting stage, observing only part of the equipment in operation will generate a large number of breakdown messages.

In an implementation of the diagnostic method in accordance with the invention, the second step (200) consists in using another filter-and-correlation stage (230) to filter the failure messages as a function of correlation between said failure messages and a data set comprising the durations of appearance, the context, the generated failure messages, and where appropriate additional data.

More precisely, this may constitute filtering relative to an expert analysis. This is because the complexity of implementing such filtering is such that it is often not possible to determine the corresponding rules a priori. Under such circumstances, it is imperative to define filtering rules a posteriori, in compliance with the other filter-and-correlation stage (230) feeding back experience and information as collected on the machine, and with the help of experts.

By way of example, filtering rules may be generated by a generic construction. Such a construction consists in filtering the breakdown information on the basis of certain breakdown characteristics. By way of example, if a breakdown occurs on the ground and disappears in flight and if the breakdown is not considered to be critical, then said breakdown is filtered. This type of construction is simple to implement before developing a helicopter.

Filtering rules may also be generated by a specific construction. Such a construction consists in filtering specific breakdown information as a function of breakdown messages. Such construction is based on feeding back experience and on expert analysis. By way of example, if breakdown message No. 1 appears and the flight stage corresponds to hovering, then the breakdown message is filtered.

In an implementation, the diagnostic method consists in defining rules in the context of a dynamic failure tree with the help of logic and dynamic gates, comprising in particular:
a "NUMBER OF OCCURRENCES" gate that is true when the number of breakdown messages recorded in flight is greater than or less than a defined threshold;
a "DURATION" gate that is true when the duration of appearance of a breakdown message is greater than or less than a defined threshold;
an above-mentioned "PAND" gate; and
a "timed PAND" gate that is true when its inputs are true and appear in a determined order with the rate of appearance being greater than or less than a determined threshold.

The "NUMBER OF OCCURRENCES" gate may be used for example to filter failure messages, and the "DURATION" gate may be used for example to take account of the durations of failure messages and also to filter them.

Taking account of the rate at which failure messages appear relies mainly on the "PAND" and "timed PAND" gates. These may also be used in association with known gates such as AND, OR, NAND, NOR, and K-of-M gates.

The invention thus makes it possible to add dependencies between the breakdown messages and to ensure that these dependencies are applied at a determined rate. It then becomes possible to take account firstly of the dependency between different failure messages and secondly of the chronological order of said messages.

In addition, the phenomenon of the effects of a breakdown probability often gives rise to a large number of failure messages appearing that depend on the architecture of the system in which the breakdown has occurred. The appearance of a breakdown at a specific location produces a cascade of effects on pieces of equipment downstream from said specific location, these breakdowns themselves giving rise to failure messages. Taking account of the rate at which these failure messages appear enables the source of the breakdown to be isolated.

The "timed PAND" gate used, e.g. in the second step (200) and in the fourth step (600), thus presents a time threshold in addition to a determined order of appearance. The inputs to this "timed PAND" gate must therefore be true in a defined order and they must also be true for a length of time that is longer than or shorter than the predefined time threshold.

The embodiments of the present invention may also be achieved with the help of a device for assisting in locating a failure in a complex system by implementing the diagnostic method as described above and comprising:
detector means arranged in a complex system and delivering operating information of said complex system;
a central unit comprising: storage means for storing predetermined data; filter means for filtering operating information and/or associated failure messages; and sorting, analysis, and comparison means acting on the predetermined data and the operating information to generate and issue a failure location message;
presentation means for presenting the location message generated by the central unit; and
recording means incorporated in the central unit to store firstly the operating information giving rise to a failure message and secondly the messages that appear in the presentation means.

In an embodiment in accordance with the invention, the central unit includes means for defining time windows during which failure occurrences must appear in successive in order to be taken into account.

The embodiments of the present invention may also be achieved with the help of an aircraft including at least one device as described above.

BRIEF DESCRIPTION OF THE DRAWINGS

The invention and its advantages appear in greater detail from the following description of an implementation given by way of illustration with reference to the accompanying figures, in which.

DETAILED DESCRIPTION

Any elements that are structurally and functionally identical and that are shown in more than one of the figures, are given the same references in each of them.

Figure 1:
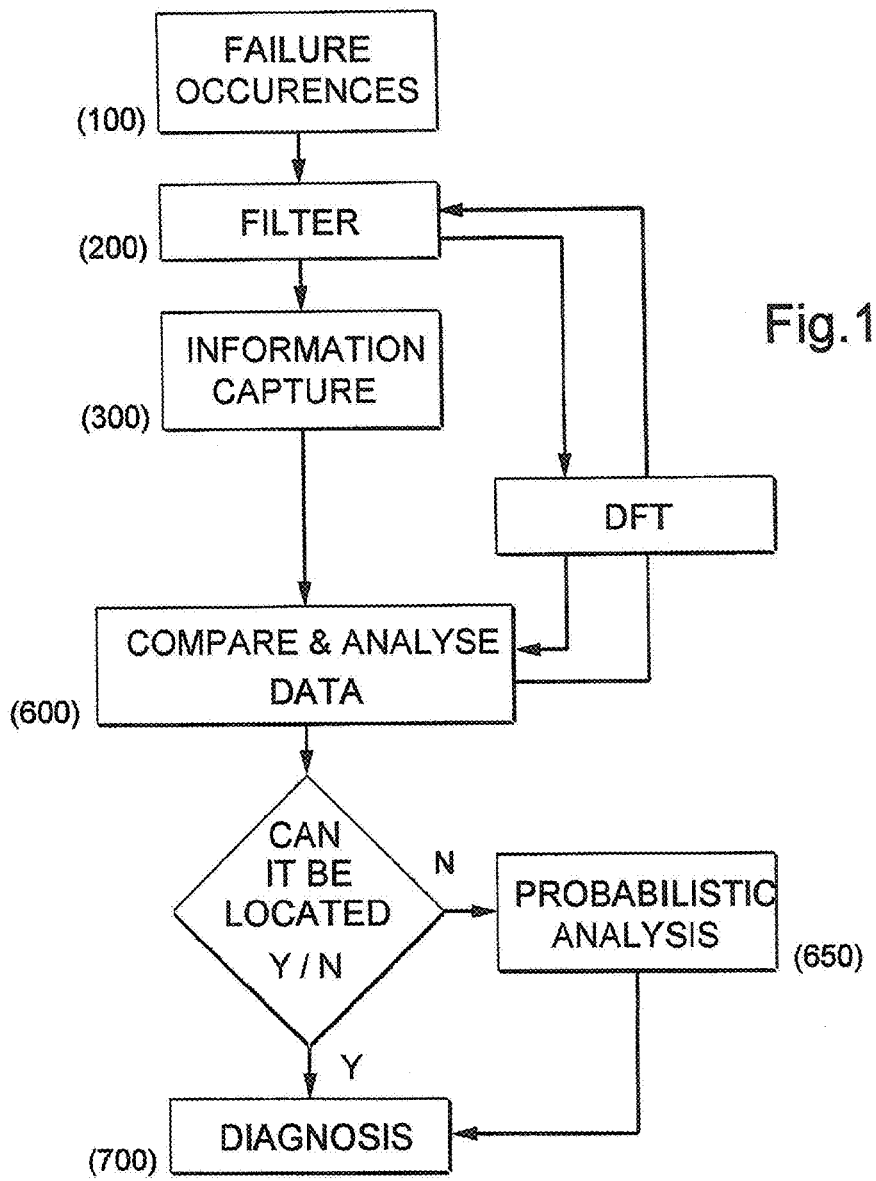
FIG. 1 is a flow chart showing the step of an implementation of the diagnostic method in accordance with the invention.

FIG. 1 shows an implementation of the diagnostic method in accordance with the invention.

The first step (100) consists in triggering a diagnostic algorithm for detecting occurrences of failure within the operating information, and for generating corresponding failure messages. The first step (100) may also consist in recovering failure messages generated directly by the complex system, such as an aircraft or pieces of equipment of said aircraft.

The second step (200) consists in filtering the failure messages in order to eliminate erroneous messages. This elimination is achieved by means of a dynamic failure tree DFT defining logical and dynamic relationships that must be satisfied by the failure messages.

In the second step (200), the diagnostic method consists in a filter stage (210) of filtering failure messages as a function of the duration of appearance of said messages.

In a filter-and-correlation stage (220) of the second step (200), the diagnostic method consists in filtering the failure messages as a function of correlation between said messages and a context such as a flight stage or a ground stage.

In another filter-and-correlation stage (230) of the second step (200), the diagnostic method consists in filtering the failure messages as a function of correlation between said messages and a data set comprising the duration of appearance, the context, the generated failure messages, and where appropriate, additional data.

Figure 2:
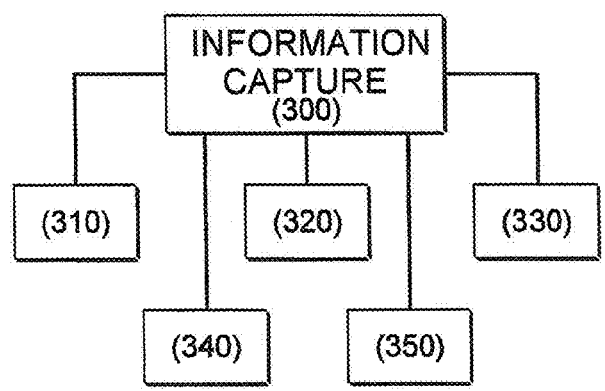
FIG. 2 is a more detailed diagram of the information capture step of an implementation of the diagnostic method in accordance with the invention as shown in FIG. 1.

The third step (300) consists in capturing the information inherent to the failure messages that remain at the end of filtering. FIG. 2 shows an implementation of the third step (300). As shown in FIG. 2, this step comprises, for example, a succession of one or more of the following stages:

a first stage (310) consisting in determining the times at which failure messages appear and disappear;

a second stage (320) consisting in verifying whether the same failure message appears on redundant pieces of equipment, and if so of grouping said messages together for analysis purposes;

a third stage (330) consisting in determining whether dependency exists between the failure messages in a time window T, and if there is no such dependency, in processing them separately;

a counting stage (340) consisting in determining the number of failure messages that appear in the time window T; and a timing stage (350) consisting in determining the durations of the failure messages.

Figure 3:
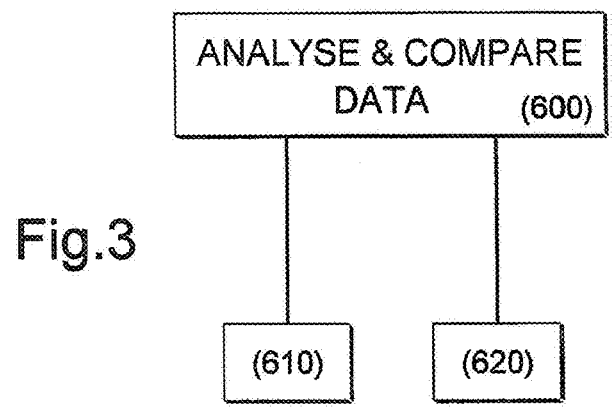
FIG. 3 is a more detailed diagram of the data comparison-and-analysis step for an implementation of the diagnostic method in accordance with the invention.

The fourth step (600) consists in sorting and/or analyzing the remaining failure messages that appear in a given predefined time window T, and/or in comparing them with prerecorded data by means of a dynamic failure tree DFT in order to identify and locate a breakdown. By way of example, the fourth step (600), as shown in FIG. 3, comprises stages including the following:

an ordering stage (610) consisting in putting the failure messages into chronological order; and a context stage (620) consisting in analyzing contextual correlation between failure messages.

In an implementation, in the event of ambiguity in locating a failure at the end of the fourth step (600) the diagnostic method in accordance with the invention consists in implementing an additional step (650) that consists in performing probabilistic analysis.

The fifth step (700) then consists in generating a corresponding diagnosis. Depending on the circumstances, the diagnostic method implements the additional step (650) that consists in performing a probabilistic analysis at the end of the fourth step (600), assuming that the breakdown could not be located sufficiently accurately.

Figure 4:
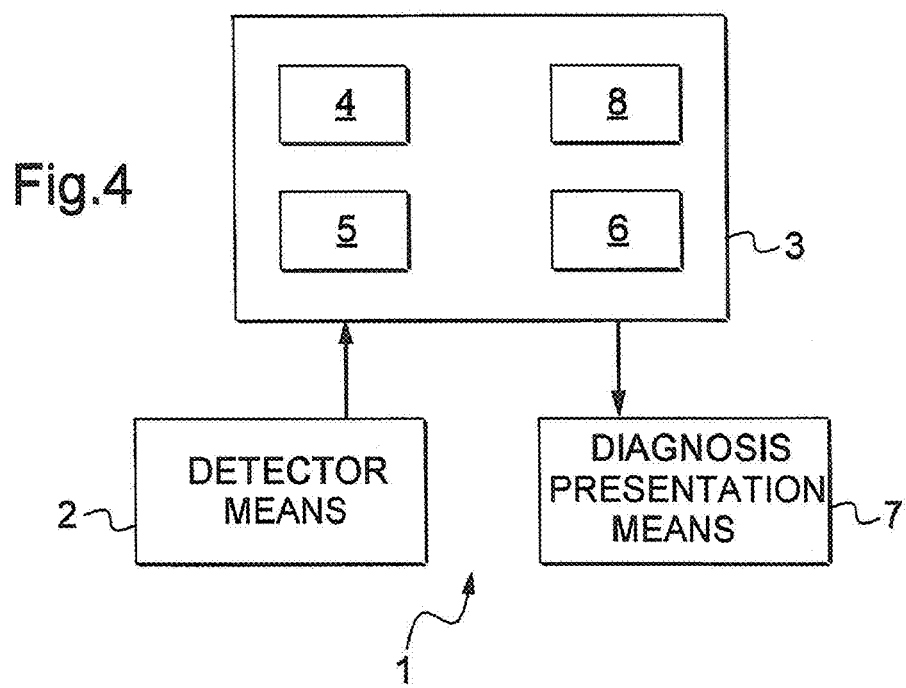
FIG. 4 is a diagram of an embodiment of a device in accordance with the invention, enabling the diagnostic method in accordance with the invention to be implemented.
Figure 5:
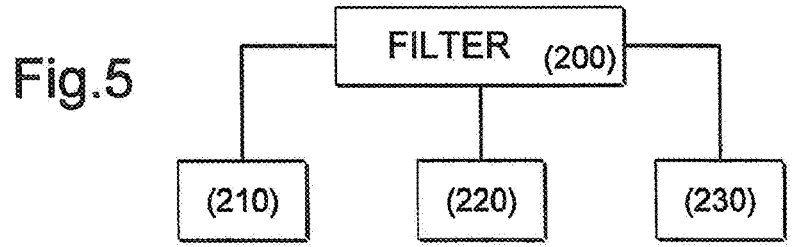
FIG. 5 is a more detailed diagram of the filter step of an implementation of the diagnostic method in accordance with the invention, as shown in FIG. 1.

FIG. 4 is a diagram of an embodiment of a device 1 in accordance with the invention for assisting in locating a breakdown. This device 1 serves to implement the diagnostic method in accordance with the invention. The device 1 has detector means 2 arranged in the complex system and delivering operating information about said complex system. The device 1 also includes a central unit 3 including storage means 4 for storing predetermined data, filter means 5 for filtering operating information and/or associated failure messages, and sorting, analysis, and comparative means 6 acting on the predetermined data and the operating information in order to generate and issue a failure location message. The device 1 in accordance with the invention also includes diagnosis presentation means 7, and more particularly means for presenting the location message generated by the central unit 6.

In an embodiment in accordance with the invention, the device 1 includes recording means 8, e.g. incorporated in the central unit 3, for storing both the operating information from which failure messages are derived and the messages that appear on the presentation means 7. The central unit 3 also includes means for defining time windows T, e.g. of duration shorter than 3 seconds, during which failure occurrences must appear in succession in order to be taken into account. By way of example, filtering relative to a three-second time window T is implemented in the context of step 200. The architecture of the central unit 3 is arranged about a microprocessor, for example.

Naturally, the present invention can be implemented in numerous variations. Although several embodiments and implementations are described, it will be readily be understood that it is not conceivable to identify exhaustively all possible implementations. It is Naturally possible to envisage replacing any of the means described by equivalent means, or any of the steps described by an equivalent step, without going beyond the ambit of the present invention.

What is claimed is:

1. A diagnostic method for locating a failure in a complex system, the method comprising:
    detecting operating information using a detector device;
    verifying a performance of the system based on the operating information;

determining an operating status of the system to be one of "operational," "non-operational" and "degraded" based on the operating information;

comparing the operating information with predetermined data when the operation status is one of "operational," "non-operational" and "degraded;" and generating at least one hypothesis as to a location of the failure of the system, wherein the generating includes:

in a first step, triggering a diagnostic algorithm by detecting a failure occurrence within the operating information and generating corresponding failure messages or recovering failure messages generated directly by the system;

in a second step, filtering the failure messages so as to eliminate erroneous failure messages by defining logical and dynamic relationships of a dynamic failure tree (DFT) that must be satisfied by the failure message;

in a third step, capturing information inherent to the failure messages not eliminated in the second step;

in a fourth step, taking the failure message from a time window T, sorting the captured information so as to obtain results, and comparing the results with predetermined data using the DFT so as to identify and locate a failure; and in a fifth step, generating a diagnosis identifying and locating the failure.

2. The diagnostic method recited in claim 1, wherein the third step includes:

in a first stage, determining a time at which failure messages appear and disappear;

in a second stage, verifying whether the same failure messages appear on redundant pieces of equipment, and if so grouping the same failure messages together for analysis; and in a third stage, determining whether dependency exists between failure messages appearing within time window T and processing the failure messages separately if no dependency exists.

3. The diagnostic method as recited in claim 1, wherein the third step includes:

in a counting stage, determining a number of failure messages appearing within the time window T; and in a timing stage, determining a duration of the failure messages.

4. The diagnostic method as recited in claim 1, wherein the generating includes performing a probabilistic analysis if an ambiguity exists regarding a location of the failure in an additional step.

5. The diagnostic method as recited in claim 4, wherein the probabilistic analysis includes taking breakdown messages generated by equipment subassemblies, identifying the equipment subassemblies having ambiguities regarding the location of the failure, and determining a ratio of a mean time between failure (MTBF) of the equipment subassemblies containing additional information on which to base the location of the failure.

6. The diagnostic method as recited in claim 1, wherein the fourth step includes determining a chronological order of the failure messages in an ordering stage.

7. The diagnostic method as recited in claim 1, wherein the fourth step includes performing a context correlation analysis on the failure messages in a context stage.

8. The diagnostic method as recited in claim 1, wherein the second step includes filtering the failure messages as a function of a duration of an appearance of the failure message.

9. The diagnostic method as recited in claim 1, wherein the second step includes filtering the failure messages as a function of correlation between the failure messages and one of an in-flight context and on the ground context in a filter-and-correlation stage.

10. The diagnostic method as recited in claim 1, wherein the second step includes filtering the failure messages as a function of correlation of the failure messages with a data set including an appearance, a duration, a context, a generated failure message and additional data in another filter-and-correlation stage.

11. The diagnostic method as recited in claim 1, wherein the logical and dynamic relationships of the dynamic failure tree (DFT) include:

a "NUMBER OF OCCURRENCES" gate that is true when a number of failure messages recorded in flight is greater than or less than a defined threshold;

a "DURATION" gate that is true when a duration of appearance of a failure message is greater than or less than a defined threshold;

a "PAND" gate; and a "timed PAND" gate that is true when its inputs are true and appear in a determined order with a rate of appearance of a breakdown being greater than or less than a determined threshold.

12. A device for assisting in locating a failure in a complex system by implementing the diagnostic method of claim 1, the device comprising:

a detector device disposed in the complex system configured to detect and deliver operating information of the system;

a central unit including a storage device configured to store predetermined data, a filter device configured to filter at least one of operating information and associated failure messages, and a sorting, an analysis and a comparison device configured to generate a failure locating message based on the predetermined data and the operating information;

a presentation device configured to present the failure location message generated by the central unit; and a recording device incorporated in the central unit configured to store the operating information giving rise to the failure message and the failure location messages presented from the presentation device.

13. The device as recited in claim 12, wherein the central unit includes a device configured to define time window T shorter than three seconds during which failure occurrences must appear in succession in order to be identified.

14. An aircraft having a device for assisting in locating a failure in a complex system by implementing the diagnostic method of claim 1, the device comprising:

a detector device disposed in the complex system configured to detect and deliver operating information of the system;

a central unit including a storage device configured to store predetermined data, a filter device configured to filter at least one of operating information and associated failure messages, and a sorting, an analysis and a comparison device configured to generate a failure locating message based on the predetermined data and the operating information;

a presentation device configured to present the failure location message generated by the central unit; and a recording device incorporated in the central unit configured to store the operating information giving rise to the failure message and the failure location messages presented from the presentation device.

* * * * *